United States Patent [19]

Redl

[11] Patent Number: 5,680,034

[45] Date of Patent: Oct. 21, 1997

[54] PWM CONTROLLER FOR RESONANT CONVERTERS

[75] Inventor: Richard Redl, Onnens, Switzerland

[73] Assignee: Toko, Inc., Japan

[21] Appl. No.: 532,476

[22] Filed: Sep. 22, 1995

[51] Int. Cl.[6] .................................................. H02M 3/335
[52] U.S. Cl. ............................ 323/21; 363/79; 363/97; 323/235
[58] Field of Search ................................ 363/16, 21, 79, 363/80, 97, 131; 323/235

[56] References Cited

U.S. PATENT DOCUMENTS

| 4,864,480 | 9/1989 | Melcher ........................... 363/21 |
| 5,387,822 | 2/1995 | Martin-Lopez et al. ............ 323/280 |
| 5,532,626 | 7/1996 | Khayat ........................... 327/53 |

OTHER PUBLICATIONS

Kwang-Hwa Liu and Fred C. Lee, "Zero-Voltage Switching Technique in DC/DC Converters," IEEE, 1986, pp. 58–70.
Richard Redl and Bela Molnar, "Class-E Resonant Regulated DC/DC Power Converters: Analysis of Operation, and Experimental Results at 1.5 MHz," IEEE PESC, 1983 Record, pp. 50–60.
N.O. Sokal and A.D. Sokal, "Class E-A New Class of High Efficiency Tuned Single-Ended Switching Power Amplifiers," IEEE Journal of Solid-State Circuits, pp. 168–176, Jun. 1975, vol. SC-10, No. 3.

Primary Examiner—Peter S. Wong
Assistant Examiner—Shawn Riley
Attorney, Agent, or Firm—William E. Hein

[57] ABSTRACT

A pulse width modulated controller controls a zero-voltage switching resonant power converter or inverter. The on time of the power switch (110) of the converter or inverter is varied by an error amplifier (280) such that the output voltage of the converter or inverter maintains proportionality to a reference voltage (290). The off time is terminated by a switch-voltage detector (320) when the voltage across the power switch (110) drops below a threshold voltage (330) due to the natural resonance of the external resonating capacitor (120) and inductors (130 and 150). In the first two embodiments of the invention, a single timing capacitor (260) is employed both for determining the on time and the off time. In two other embodiments, two timing capacitors (262 and 264) are employed for separately determining the maximum allowed off time and the variable on time. A cycle-by-cycle current limit circuit comprising a current sensor (605), a comparator (610), and an R-S latch (620) may be added to the circuits representing each of the embodiments. By incorporating a soft start subcircuit (775) and an overlap detector (710, 715, 20, 725), protection against overdissipation of the power switch caused by loss of zero-voltage switching can also be implemented. The soft start subcircuit can also be triggered by a voltage detector (740, 745), which monitors the output voltage of the power converter or some other voltage within the system, such as the peak voltage across the power switch (110), to effectively implement overvoltage protection.

9 Claims, 7 Drawing Sheets

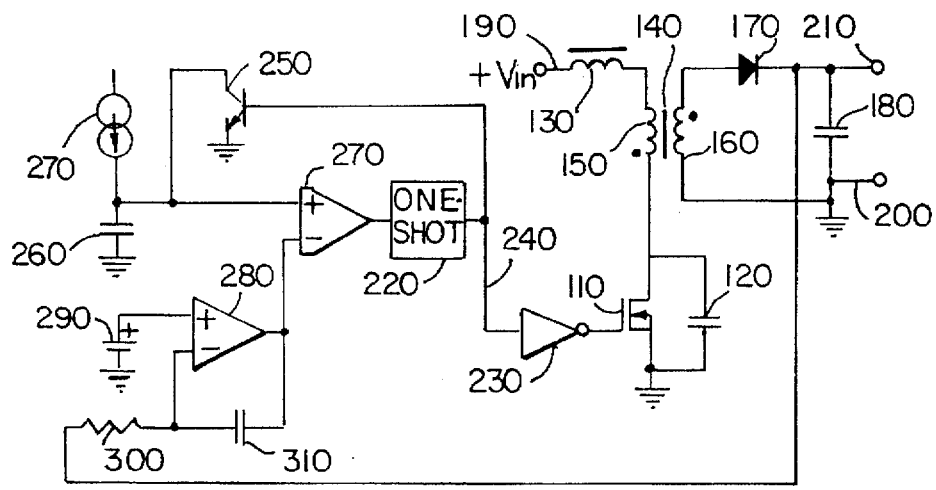
FIG. 1
(PRIOR ART)
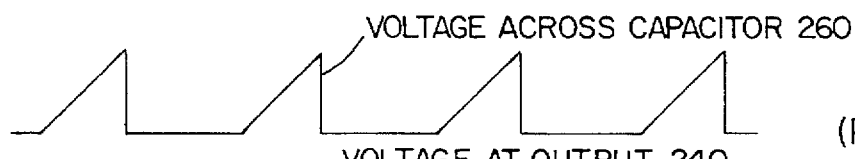
FIG. 2A
(PRIOR ART)
FIG. 2B
(PRIOR ART)
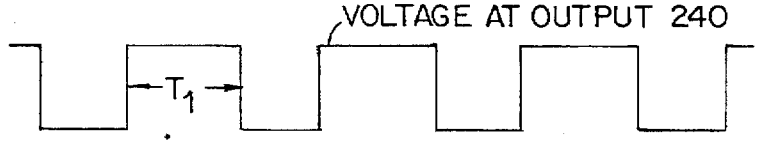
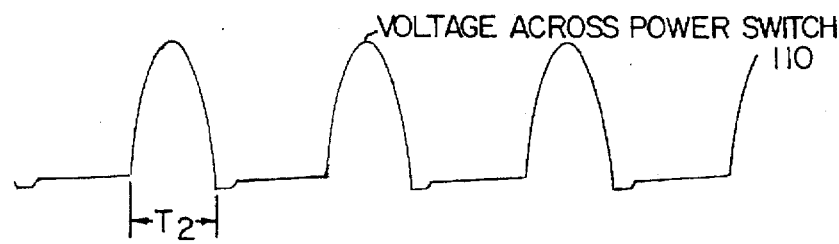
FIG. 2C
(PRIOR ART)
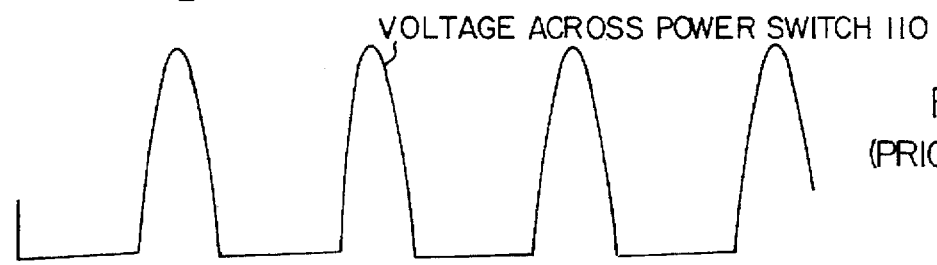
FIG. 3A
(PRIOR ART)
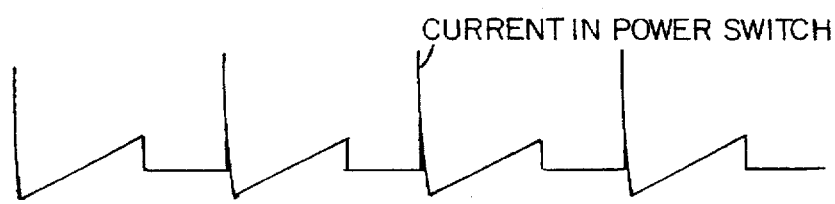
FIG. 3B
(PRIOR ART)

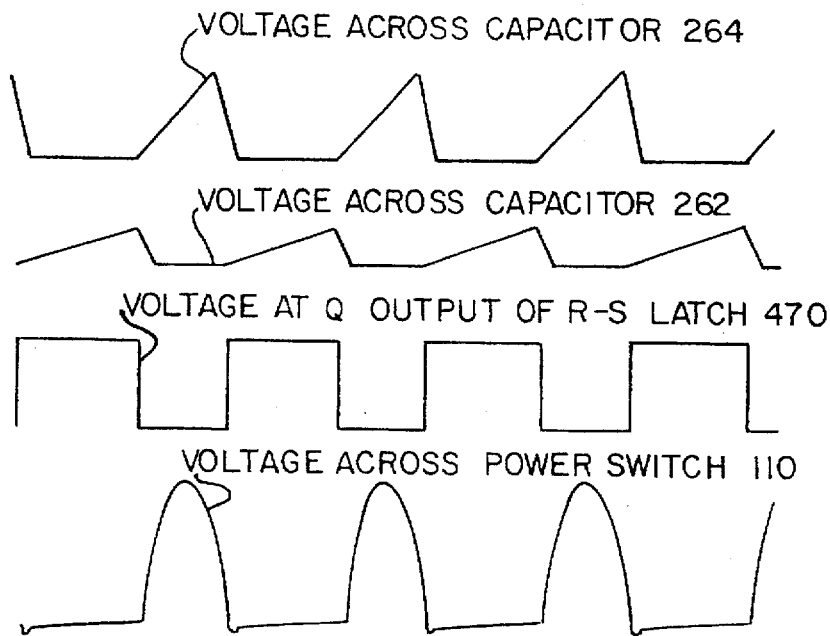
FIG. 12 A
FIG. 12 B
FIG. 12 C
FIG. 12 D
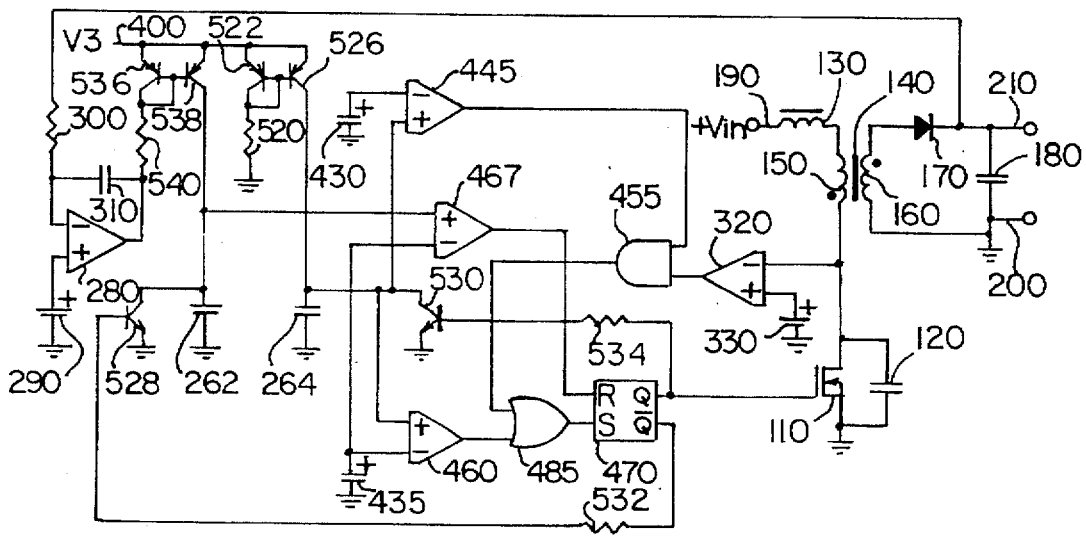
FIG. 13

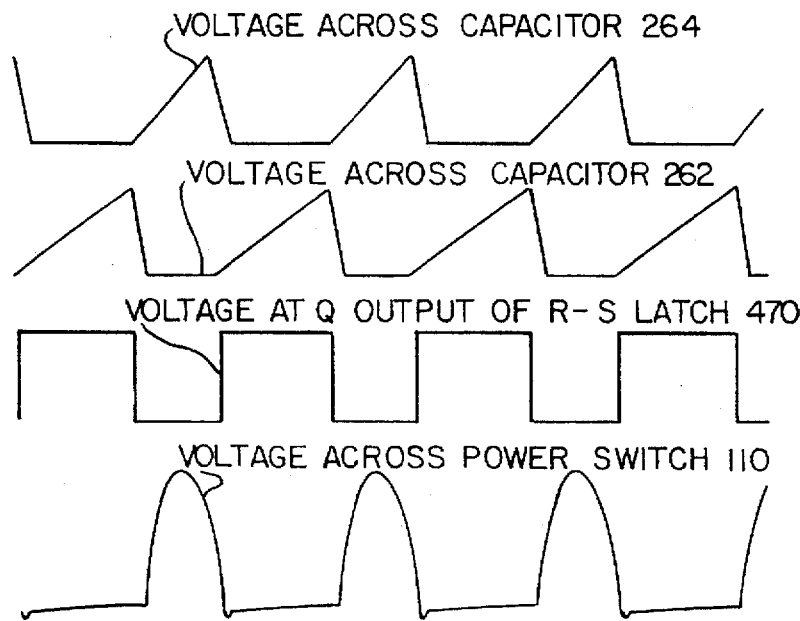
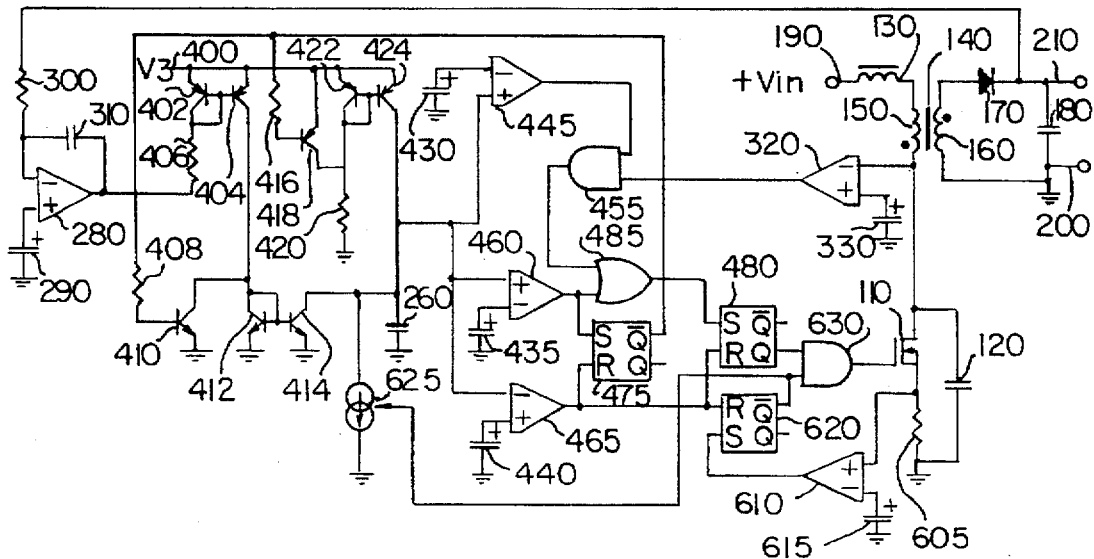
FIG. 15

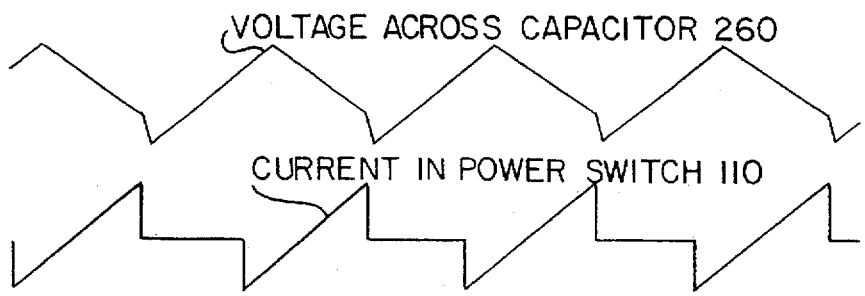
FIG. 16A
FIG. 16B
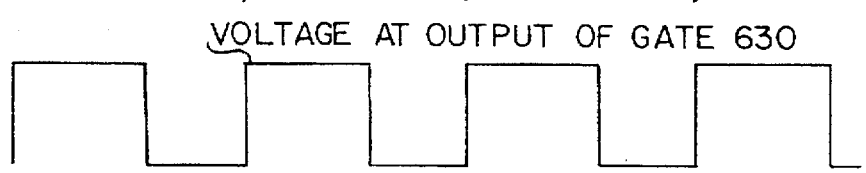
FIG. 16C
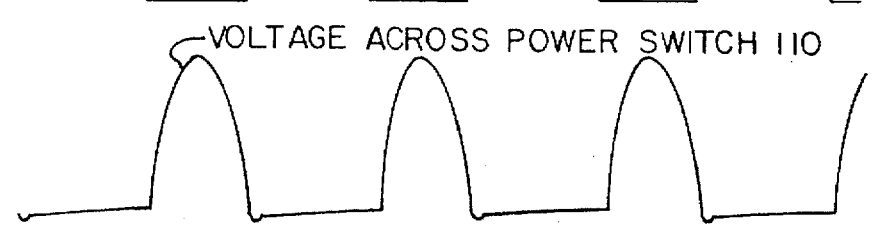
FIG. 16D
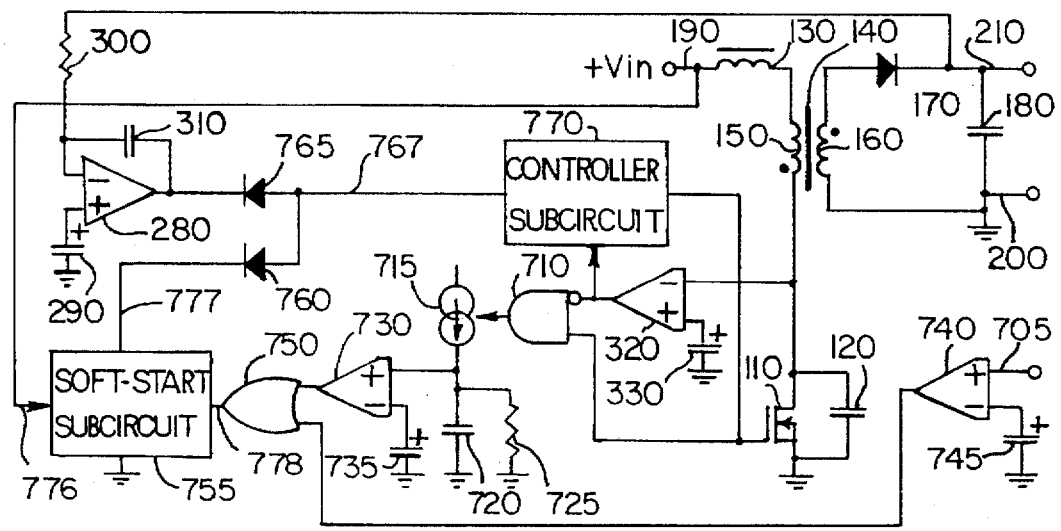
FIG. 17

PWM CONTROLLER FOR RESONANT CONVERTERS

BACKGROUND AND SUMMARY OF THE INVENTION

This invention relates to pulse width modulation controllers used for controlling DC/DC power converters or DC/AC power inverters, operating in voltage resonance mode.

Operating a DC/DC power converter or DC/AC power inverter, hereinafter collectively referred to as converters, in voltage resonance mode is a useful technique for eliminating the turn-on loss and reducing the turn-off loss in the power switching transistor. In voltage resonance mode, a ringing voltage waveform is generated across the transistor during the time it is turned off. The ringing is achieved with the help of one or more resonating inductors and capacitors connected to the transistor. The ringing appears as a voltage swing, first up and then down, toward zero. The case when the voltage across the transistor is close to zero at the time it is turned on is known as zero voltage switching (ZVS). In ZVS converters, the turn-on loss is virtually absent. Also, the turn-off loss is substantially reduced due to the presence of a resonating capacitor in parallel with the switch. ZVS is essential in high frequency converters for achieving high power conversion efficiency. In addition to increasing the efficiency, ZVS effectively reduces the electromagnetic interference, or EMI, generated by the converter. Many different versions of ZVS DC/AC inverters and DC/DC converters have been described in the technical literature. Exemplary of the literature is Sokal et al., "*Class E—a new class of high efficiency tuned single-ended switching power amplifiers*," IEEE Journal of Solid-State Circuits, June, 1975, pp. 168–175; Redl et al., "*Class E resonant regulated dc/dc power converters: analysis of operation, and experimental results at 1.5 MHz*," PESC 1983 Record (IEEE Publication No. 86CH1877-0), pp. 50–60; and Liu et al., "*Zero-voltage switching technique in dc/dc converters*," PESC 1986 Record (IEE Publication No. 86CH2310-1), pp. 58–70.

Usually ZVS converters are controlled with a special type of pulse width modulation method, with variable on time and quasi-constant off time. The switch on time is varied such that the controlled parameter (normally the DC output voltage) stays constant in spite of changes in the input voltage or load current. In programmable power supplies, the controlled parameter follows a variable reference voltage. The off time of the switch is either constant or it varies slightly, depending on the actual control technique.

FIG. 1 shows a flyback-type ZVS converter controlled with a prior art controller, such as the ML4815 integrated circuit manufactured by Micro Linear Corporation. The ZVS flyback converter comprises a switching transistor 110, a resonant capacitor 120, a resonant inductor 130, a flyback transformer 140 having a primary winding 150 and a secondary winding 160, an output rectifying diode 170, and an output filter capacitor 180. The converter is powered by a DC voltage source connected between a positive input terminal 190 and the negative input (ground) terminal 200. The load (not shown) is connected between the positive output terminal 210 and the negative output terminal 200. In this prior art circuit, the negative output terminal is the same as the negative input terminal.

After the one-shot multivibrator 220 is triggered, it turns off the power switch 110 through an inverting buffer 230. The power switch is in the off or non-conducting state during the whole duration T1 of the timed section of the operation of the one-shot multivibrator 220. The output 240 of that multivibrator is at a high level during the off state. The transistor 250 is turned on by that high level, resulting in the voltage across the capacitor 260 being zero. When the timing of the one-shot multivibrator is completed, its output goes to low, leading to the turn-on of the power switch 110 and the turn-off of transistor 250. The constant current source 270 now begins to charge capacitor 260, producing a linearly increasing voltage. The charging process is terminated when the voltage at the non-inverting input of comparator 270 exceeds the voltage at the inverting input of the same comparator. At that time, the output of the comparator goes high and triggers the one-shot. As a result, the output of the one-shot also goes high, the switch 110 is turned off, the transistor 250 is turned on, and another switching period commences.

The threshold voltage of comparator 270 is set by an error amplifier 280. The output of that error amplifier is connected to the inverting input of comparator 270. The error amplifier receives two signals at its inverting and non-inverting inputs, a reference voltage 290, and the output voltage (the voltage at terminal 210) through a series impedance comprising a resistor 300. To ensure stability of the system, a feedback impedance (capacitor 310) is connected between the output and the inverting input of the error amplifier 280. When the output voltage of the converter increases because the input voltage increased or the load current decreased, for example, the voltage at the output of the error amplifier becomes smaller, leading to a reduction in the time required for the sawtooth voltage of capacitor 260 to reach that voltage. The end result is a decrease in the time the switch 110 is turned on. The reduced on time of the switch leads to a reduction in the energy absorbed from the power source connected to the input terminals of the converter. Eventually, the system reaches an energy balance again, at the same output voltage.

FIGS. 2A–C illustrate the characteristic waveforms of the prior art circuit of FIG. 1 in normal operation. FIG. 2A is a plot of the voltage across the capacitor 260. FIG. 2B is a plot of the voltage at the output 240 of the one-shot multivibrator. FIG. 2C is a plot of the voltage across the switch 110. As illustrated, the switch voltage swings back to zero and is clamped by the intrinsic body diode of the MOSFET device before the switch is turned on again by the one-shot multivibrator.

The prior art circuit of FIG. 1 provides a variable on-time, constant off-time type of control. That type of control is suitable for the case when the time T2 of the ringing waveform, the time required to return to zero, is constant. Unfortunately, the time T2 is a function of many parameters, including the supply voltage, the load, and all of the component values and tolerances of the power circuit. In a practical case, time T2 may easily vary over a range of 2 to 1. FIG. 3A illustrates the switch voltage waveform, and FIG. 3B illustrates the switch current waveform when the off time is too short and the switch is turned on early. FIG. 4A illustrates the switch voltage waveform, and FIG. 4B illustrates the switch current waveform when the off time is too long and the switch is turned on late. In both cases, there is substantial voltage across the switch at the turn-on instant, leading to a large current spike and excess dissipation in the switch. The rapid collapse of the switch voltage and the sharp current spike result in an increase in the EMI generated by the converter, while the excess dissipation reduces the efficiency and causes reliability problems. All of those results are undesirable and should be avoided. The premature turn-on of the power switch in the case illustrated in FIGS. 3A–B can be easily avoided by setting the time T1 of the one-shot multivibrator to be longer than the longest expected time T2. In many applications it is, however, very difficult or even impossible to avoid the late turn-on of the power switch in the case illustrated in FIGS. 4A–B, especially if a large time T1 has been selected for the reason discussed above. Common, although not perfect, practice is to choose time T1 such that it yields ZVS under nominal conditions while ZVS is lost when time T2 is longer or substantially shorter than time T1. In many designs it is not possible, using the method illustrated in the prior art circuit of FIG. 1, to achieve ZVS over the desired range of operation.

FIG. 5 illustrates the flyback ZVS converter controlled by a different prior art controller, such as the UC1862 integrated circuit manufactured by Unitrode Integrated Circuits Corporation. This controller avoids the main drawback of the prior art controller of FIG. 1 and operates as follows. After it is triggered, the one-shot multivibrator 222 turns off the power switch 110 through the inverting buffer 230. The power switch is turned on either after the time T2 of the one-shot multivibrator has expired or when the comparator 320, sometimes known as a zero-voltage detecting or ZVD comparator, terminates the timing, whichever happens earlier. The inverting input of comparator 320 is connected to the drain of the power MOSFET switch, and the non-inverting input is connected to a voltage source 330. The output of comparator 320 goes high and possibly terminates the timing when the voltage across the power switch becomes smaller than the voltage of the voltage source 330, e.g. smaller than 2 volts. Such a low voltage is considered sufficiently small that the increase in dissipation and EMI caused by the discharge of the resonant capacitor 120 is negligible. Although not illustrated in FIG. 5, the one-shot multivibrator 222 must have provisions for not responding to the output of comparator 320 immediately after being triggered, in order to avoid turning on the power switch immediately after it is turned off.

The remainder of the prior art control circuit of FIG. 5 includes a voltage controlled oscillator, or VCO, comprising a voltage controlled current source 272, a timing capacitor 260 for the VCO, a hysteretic comparator 272 with an upper threshold V2 and a lower threshold V1, and a discharge transistor 250. This circuit also includes an error amplifier 280, a voltage reference source 290, an input resistance 300, and a feedback capacitor 310. When the output of the hysteretic comparator 272 is low, the transistor 250 is off, and the voltage controlled current source 22 charges the timing capacitor 260. Eventually, the capacitor voltage reaches the upper threshold V2, and the output of comparator 272 goes high. The low-to-high transition triggers the one-shot multivibrator 272 and also turns on transistor 250. That transistor starts to discharge capacitor 260. When the capacitor is discharged to the lower threshold V1, the output of the hysteretic comparator 272 goes low, transistor 250 turns off, and the charging cycle of the capacitor begins again.

The current of the voltage controlled current source 272 is proportional to the output voltage of the error amplifier 280. The non-inverting input of the error amplifier is connected to the output 210 of the converter, while the inverting input of the error amplifier is connected to the voltage reference source 290 through the resistor 300. A feedback capacitor 310 is connected between the output and the inverting input of the error amplifier to ensure system stability. When the output voltage of the converter increases because the input voltage increased or the load current decreased, for example, the voltage at the output of the error amplifier becomes higher, leading to an increase in the current of the voltage controlled current source 272. The increase in that current leads to reduction in the period T4 of the VC0, and also a reduction in the on time of the power switch 110. The end result is a reduction in the energy absorbed from the power source connected to the input terminals of the converter. Eventually, the system reaches an energy balance again, while maintaining the same output voltage.

FIGS. 6A–C illustrate the characteristic waveforms of the prior art circuit of FIG. 5. FIG. 6A is a waveform diagram of the voltage across the capacitor 260. FIG. 6B is a waveform diagram of the voltage at the output of the one-shot multivibrator 222. FIG. 6C is a waveform diagram of the voltage across the switch 110. It can be seen that as soon as the switch voltage swing back to zero, the switch is turned on again.

By using the ZVD comparator, it is clearly possible to set the maximum timing value T2 of the one-shot multivibrator such that it accommodates the largest ringing time T1, while retaining near ZVS operation under most conditions.

The prior art controller of FIG. 5 suffers two drawbacks. First, it requires two independent timing circuits, a VCO, and a one-shot multivibrator. Secondly, the minimum on time for the power switch is generated as the difference between the minimum period of the VC0 and the ringing time T1 of the switch voltage waveform. Due to component tolerances and changes in the operating conditions, the minimum on time cannot be defined very accurately. This fact may lead to loss of regulation under light load and/or high input voltage conditions, or to loss of zero-voltage switching. Alternatively, highly accurate, and therefore more costly, timing and resonant components and/or individual adjustment of the timing parameters may be required.

It is therefore an object of the present invention to provide a controller for resonant converters that ensures zero-voltage switching over a wide range of operating conditions and components tolerances.

It is a further object of the present invention to provide a controller for resonant converters that does not require individual adjustment of the timing parameters.

It is a further object of the present invention to provide a controller for resonant converters that is able to maintain regulation of the output voltage over a wide range of operating conditions and component tolerances.

It is a further object of the present invention to provide a controller for resonant converters that includes additional protection against overload, against overdissipation of the power switch in case of loss of zero-voltage switching, and against overvoltage across the switching device or across the load.

It is yet another object of the present invention to provide a controller for resonant converters that is suitable for realization with monolithic integrated circuit technology.

BRIEF DESCRIPTION OF THE DRAWINGS

FIG. 1 is a schematic circuit diagram of a ZVS flyback converter and a prior art controller of the fixed off-time and variable on-time type.

FIGS. 2A–C are waveform diagrams showing characteristic waveforms exhibited by the prior art circuit of FIG. 1 during normal operation.

FIGS. 3A–B are waveform diagrams showing waveforms of the switch voltage and current exhibited by the circuit of FIG. 1 when the off time is too short.

FIGS. 12A–D are waveform diagrams showing characteristic waveforms exhibited by the circuit of FIG. 11.

FIG. 13 is a schematic circuit diagram of a ZVS flyback converter and a controller therefor in accordance with a fourth embodiment of the present invention.

FIGS. 14A–D are waveform diagrams showing characteristic waveforms exhibited by the circuit of FIG. 13.

FIG. 15 is a schematic circuit diagram illustrating implementation of an overload protection circuitry in the circuit of FIG. 7.

FIGS. 16A–D are waveform diagrams showing characteristics waveforms exhibited by the circuit of FIG. 15.

FIG. 17 is a schematic circuit diagram illustrating implementation of overdissipation and overvoltage protection circuitry in the circuit of FIG. 7.

DESCRIPTION OF THE PREFERRED EMBODIMENTS

Figure 4A:
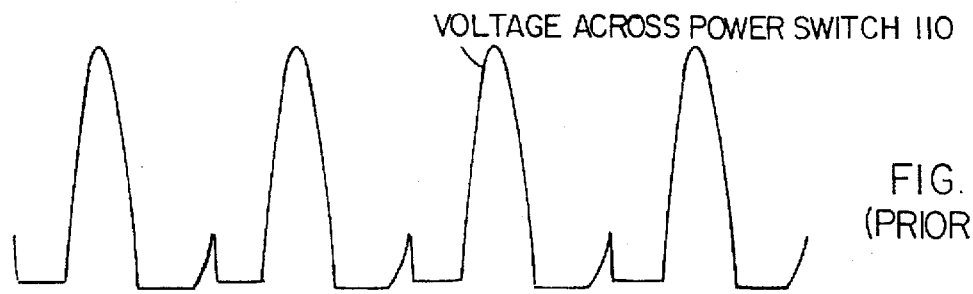
FIGS. 4A–B are waveform diagrams showing waveforms of the switch voltage and current exhibited by the circuit of FIG. 1 when the off time is too long.
Figure 4B:
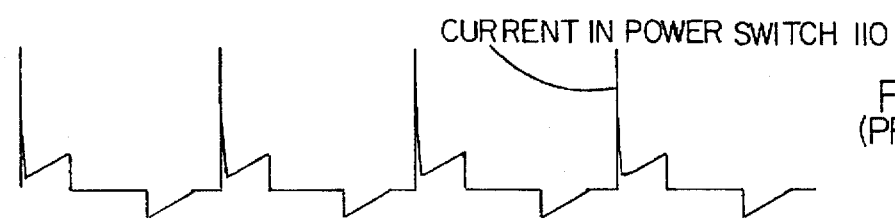
Figure 5:
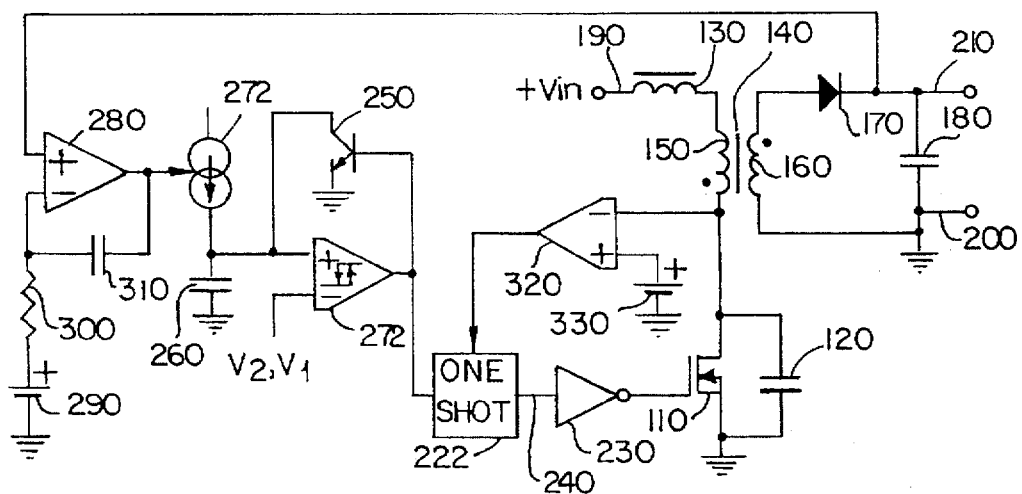
FIG. 5 is a schematic circuit diagram of a ZVS flyback converter and a prior art controller of the adaptive off-time and variable frequency type.
Figure 6A:
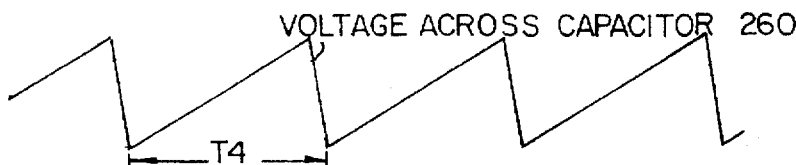
FIGS. 6A–C are waveform diagrams showing characteristic waveforms exhibited by the prior art circuit of FIG. 5.
Figure 6B:
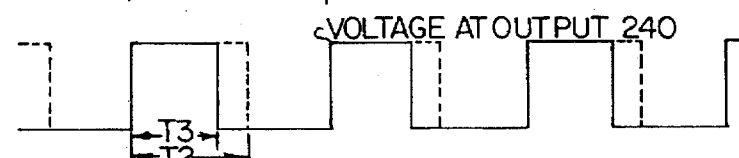
Figure 6C:
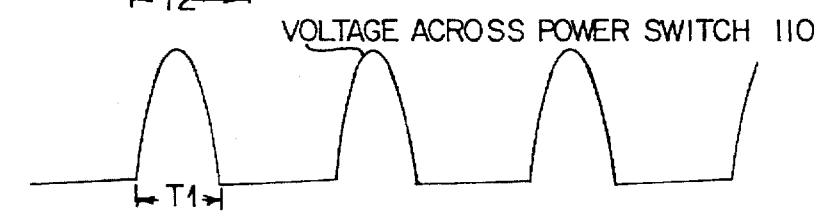
Figure 7:
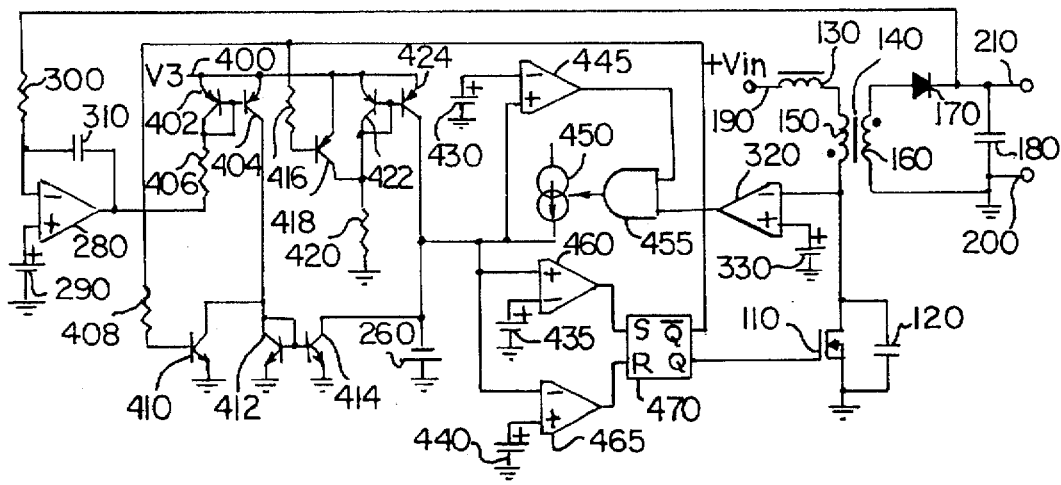
FIG. 7 is a schematic circuit diagram of a ZVS flyback converter and a controller therefor in accordance with a first embodiment of the present invention.

Referring now to FIG. 7, there is shown a schematic circuit diagram of a ZVS flyback converter and a controller therefor in accordance with a first embodiment of the present invention. A power switch 110 is controlled by an R-S latch 470. When latch 470 is set, the power switch 110 is turned on. When the latch 470 is reset, the power switch 110 is turned off. Latch 470 is set by a comparator 460 and is reset by another comparator 465. The output of comparator 460 goes high when the voltage of a timing capacitor 260 exceeds a threshold of comparator 460. That threshold, 3 volts, for example, is set by a voltage source 435. The output of comparator 465 goes high when the voltage of the timing capacitor 260 decreases below the threshold (e.g. 1 volt) of the comparator 465, set by a voltage source 40. During the time that the power switch 110 is turned off, the timing capacitor 260 is charged by a current established in the resistor 420 and is mirrored by a current mirror comprising a pair of PNP transistors 422, 424. The emitters of transistors 422, 424 are connected to a bus 400 with a voltage V3 (e.g. 4 volts) between the buse and ground. When the output of a two-input AND gate 455 goes high, the voltage controlled current source 450 is enabled and the charging current increases by the addition of the current flowing in that current source. The additional current is normally significantly higher by at least a factor of three than the current flowing in transistor 424. This leads to a rapid increase in the voltage of the timing capacitor 260 and a quick termination of the off time of the power switch 110. The output of the AND gate 455 goes high when two conditions are met simultaneously: (1) the voltage across capacitor 260 exceed the voltage (e.g. 1.5 volts) of voltage source 430; and (2) the voltage across switch 110 decreases below the voltage of voltage source 330. When the first condition is met, the output of a comparator 445 goes high. When the second condition is met, the output of a comparator 320 goes high. The first condition is required to avoid turn-on of the power switch 110 immediately after turn-off. The second condition is required to ensure zero-voltage switching by enabling the turn-on of the power switch 110 as soon as the voltage across it swings back to nearly zero.

Timing capacitor 260 is discharged by the current flowing in an output transistor 414 of the current mirror system comprising transistors 402, 404, 412, and 414. The input current of the current mirror system is established by a resistor 406. Resistor 406 is connected between the output of an error amplifier 280 and an input of the current mirror system. The reference voltage of the error amplifier is that of a voltage source 290. An input resistor 300 and a feedback capacitor 310 are required for ensuring stability of the complete feedback loop.

The output of the error amplifier becomes lower when the output voltage of the converter becomes higher, leading to an increase in the current flowing in resistor 406. The increased current causes a reduction in the discharge time of capacitor 260, and also in the on time of switch 110. The end result is regulation of the output voltage of the converter.

During the off time of switch 110, transistor 410 is held on through a resistor 408, diverting the input current of the current mirror that comprises transistors 412 and 414. Thus, no discharge current is available for timing capacitor 260 during the off time. Similarly, during the on time of switch 110, transistor 418 is held on through a resistor 416, diverting the input current of the current mirror that comprises transistors 422 and 424. Thus, no discharge current is available for timing capacitor 260 during the on time.

Figure 8A:
FIGS. 8A–C are waveform diagrams showing characteristic waveforms exhibited by the circuit of FIG. 7.
Figure 8B:
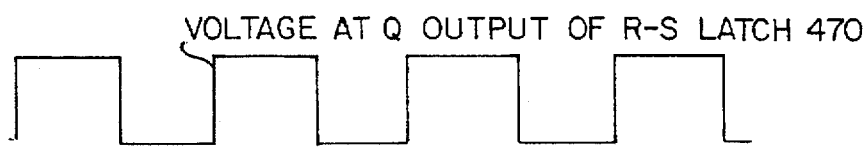
Figure 8C:
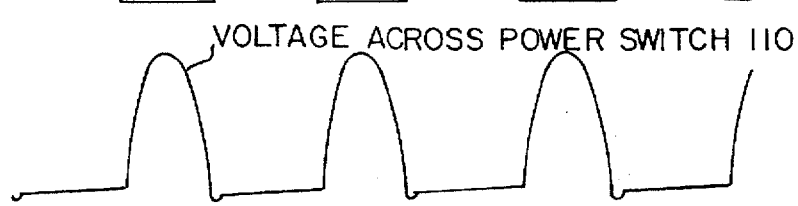

Referring now to FIG. 8A–C, there are shown characteristic waveforms exhibited by the circuit of FIG. 7. FIG. 8A is a waveform diagram of the voltage across the timing capacitor 260. FIG. 8B is a waveform diagram of the voltage at a Q output of R-S latch 470. FIG. 8C is a waveform diagram of the voltage across the switch 110. As is evident from these waveform diagrams, all of the drawbacks of the prior art circuits discussed above are eliminated. In this circuit, ZVS is ensured by a zero-voltage detector that quickly terminates the off time of the power switch 110. A single timing circuit is used to perform the two functions of setting the maximum off time and setting the variable on time. There is practically no interaction between the on-time setting and the off-time setting sections of the controller.

Figure 9:
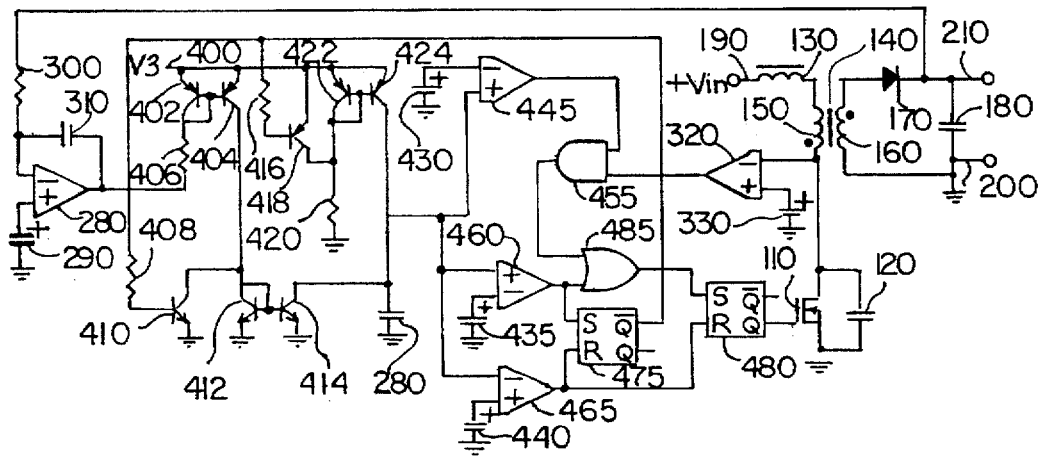
FIG. 9 is a schematic circuit diagram of a ZVS flyback converter and a controller therefor in accordance with a second embodiment of the present invention.

Referring now to FIG. 9, there is shown a schematic circuit diagram of a ZVS flyback converter and a controller therefor in accordance with a second embodiment of the present invention. The difference between this circuit and the circuit of FIG. 7 is that in the circuit of FIG. 9 the off timing is not terminated rapidly upon detecting the zero-voltage condition of the switch 110. A turn-on signal is generated for the power switch when the following conditions are met: the output of comparator 445 is high, indicating that the timing signal passed the lower threshold set by voltage source 430 AND the output of the ZVD comparator 320 is high, indicating that the voltage across the power switch is low OR the output of comparator 460 is high, indicating that the maximum allowed off time has expired. The required logic functions are accomplished by a two-input AND gate 455 and a two-input OR gate 485. The turn-on signal sets the R-S latch 480. If the output of the AND gate 455 sets the latch 480, the timing waveform of the voltage across capacitor 460 continues to increase at the same rate, all the way to the threshold of comparator 460. When that threshold is reached, another R-S latch 475 is set. The inverted (Q bar) output of R-S latch 475 disables the charging current mirror comprising transistors 422, 424 and enables the discharging current mirror comprising transistors 412, 414.

Figure 10A:
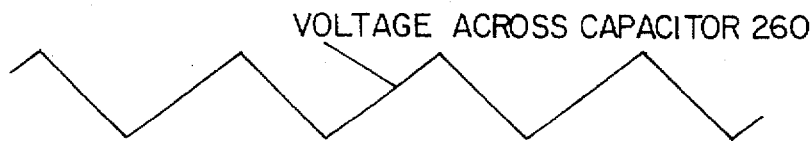
FIGS. 10A–C are waveform diagrams showing characteristic waveforms exhibited by the circuit of FIG. 9.
Figure 10B:
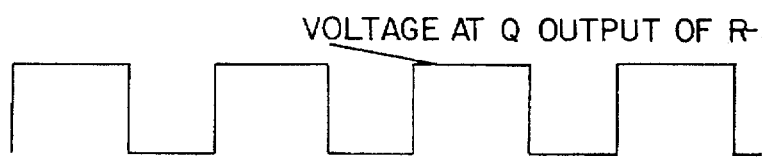
Figure 10C:
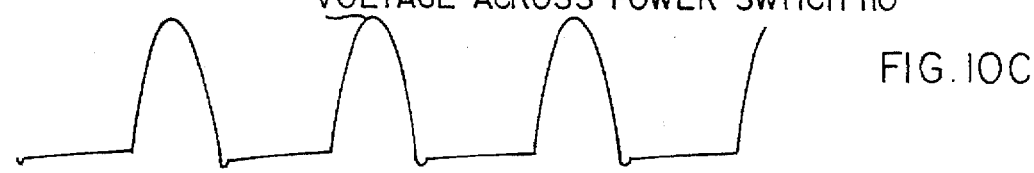

Referring now to FIGS. 10A–C, there are shown waveform diagrams illustrating characteristic waveforms exhibited by the circuit of FIG. 9. FIG. 10A is a waveform diagram of the voltage across the capacitor 260. FIG. 10B is a waveform diagram of the voltage at the Q output of the R-S latch 480. FIG. 10C is a waveform diagram of the voltage across the switch 110.

The practical advantage of the embodiment of FIG. 9 over that shown in FIG. 7 is that only negligible overshoot develops in the timing voltage across capacitor 260 when it reaches the upper threshold set by voltage source 435. The overshoot is not desirable because it leads to an increase in the subsequent on time and (2) requires an increased voltage V3 on bus 400. In low voltage applications even a small overshoot on the order of 0.5 volts should be avoided.

The disadvantage of the embodiment of FIG. 9 over that of FIG. 7 is an increase in the value of the minimum achievable on time. In the circuit of FIG. 7, the minimum achievable on time is equal to the product of the timing capacitance and the difference between the upper and lower threshold divided by the maximum discharge current. In the circuit of FIG. 9, an additional term appears. That additional term is the difference between the maximum off time and the actual off time of the power switch. The maximum off time is equal to the timing capacitance times the difference between the upper and lower threshold divided by the set charge current. It should be noted that although the increase in the minimum achievable on time reduces the control range of the converter, in many designs a reduced control range is acceptable.

The controllers of FIGS. 7 and 9 are in many respects better than the prior art controllers discuss in detail hereinabove and are quite suitable for a number of designs. Both circuits have, however, minor deficiencies which might prevent their usage in some demanding applications. The third preferred embodiment of the present invention, shown in FIG. 11, eliminates those minor deficiencies and is considered the best circuit for overall use.

Figure 11:
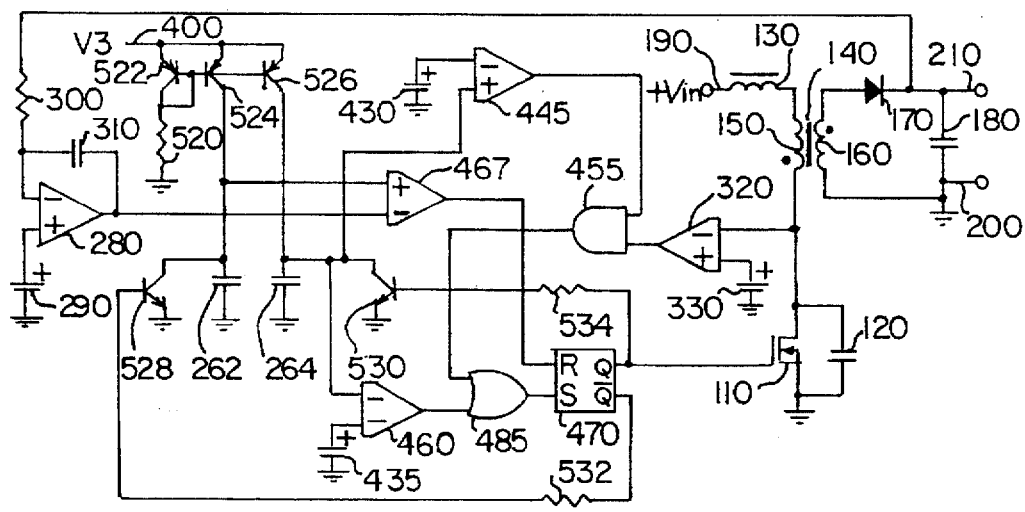
FIG. 11 is a schematic circuit diagram of a ZVS flyback converter and a controller therefor in accordance with a third embodiment of the present invention.

Referring now to FIG. 11, the off time setting and the on time setting are completely separated. The maximum off time is generated by way of several circuit components and parameters. These include the current at the output of the current mirror formed by transistors 522 and 526, a capacitor 264, a reference source 435, and a comparator 460. The input current of the current mirror is set by a resistor 520. The power switch 110 is turned on when either the maximum off time is reached or the AND combination of the output of the ZVD comparator 320 and comparator 445 goes high. The OR function is accomplished by a gate 485 and the AND function is accomplished by a gate 455.

The on time is generated by way of several circuit components and parameters. These include the current at the output of the current mirror formed by transistors 522 and 524, a capacitor 262, the output voltage of an error amplifier 280, and a comparator 467. When the output of comparator 467 goes high, indicating that the voltage across capacitor 262 has reached the threshold voltage set by the output of error amplifier 280, an R-S latch 470 is reset and its output goes low and turns off the power switch 110.

During the off time, a transistor 528 is turned on through a resistor 532, thereby maintaining the voltage across an on-time-setting capacitor 262 near zero. During the on time, a transistor 30 is turned on through a resistor 34, thereby maintaining the voltage across an off-time-setting capacitor 264 near zero.

Regulation of the output voltage of the converter is achieved by an error amplifier 280 and associated components comprising an input resistor 300, a feedback capacitor 310, and a reference voltage source 290. For example, when the output voltage of the converter is too high, the output voltage of the error amplifier 280 decreases, leading to a reduction of the on time and eventual stabilization of the output voltage of the converter.

Referring now to FIGS. 12A–D, there are shown waveform diagrams illustrating characteristic waveforms exhibited by the circuit of FIG. 11. FIG. 12A is a waveform diagram of the voltage across capacitor 264. FIG. 12B is a waveform diagram of the voltage across capacitor 262. FIG. 12C is a waveform diagram of the voltage at the Q output of the R-S latch 470. FIG. 12D is a waveform diagram of the voltage across the switch 110.

Referring now to FIG. 13, there is shown a schematic circuit diagram of a ZVS flyback converter and a controller therefor in accordance with a fourth embodiment of the present invention. In this circuit, the on-time modulation is achieved by changing the charging current of capacitor 262 with the help of the output of the error amplifier. The charging current is equal to the output current of the current mirror formed by transistors 536, 538. The input current of that current mirror is established by a resistor 540 connected between the output of the error amplifier 280 and the input terminal of the current mirror. When the capacitor voltage reaches the threshold of comparator 467 set conveniently by a voltage source 45, an R-S latch 470 is reset, and the power switch 110 is turned off. Voltage regulation is achieved as follows: when, for example, the output voltage of the converter is too high, the output voltage of the error amplifier 280 is decreased, leading to an increase in the mirror current, a subsequent reduction of the on time, and eventual stabilization of the output voltage of the converter. The remainder of the circuit of FIG. 13 function as described above in connection with FIG. 11.

Referring now to FIGS. 14A–D, there are shown waveform diagrams illustrating characteristic waveforms exhibited by the circuit of FIG. 13. FIG. 14A is a waveform diagram of the voltage across capacitor 264. FIG. 14B is a waveform diagram of the voltage across capacitor 262. FIG. 14C is a waveform diagram of the voltage at the Q output of the R-S latch 470. FIG. 14D is a waveform diagram of the voltage across the switch 110.

A customary task of a controller such as described above is to prevent damage to the power switch in the event the output is overloaded or short circuited. Several types of overload protection schemes are known in the prior art, including those which provide cycle-by-cycle protection. In such a protection scheme, the power switch is turned off immediately upon detecting that the current in the switch has exceeded a predefined level. The power switch is turned on again at the beginning of the next clock period or after a certain elapsed time.

Cycle-by-cycle protection can be used in ZVS converters, but it is imperative that the zero-voltage switching property is retained when the protection is operating. FIG. 15 illustrates how such a protecting circuit may be implemented in the controller of FIG. 9. The same protection circuit may be employed with the controller of FIG. 7.

Referring now to FIG. 15, the switch current is monitored with the help of a current sense resistor 605. When the voltage across resistor 605 exceeds the voltage of a voltage source 615 due to an excessive switch current, the output of a comparator 610 goes high and sets an R-S latch 620. The inverted output of the latch 620 inhibits the drive signal for switch 110 through an AND gate 630. The R-S latch 620 is reset, and the drive signal for switch 110 is enabled when the voltage across the timing capacitor 260 drops below the voltage level set by voltage source 440.

To ensure zero-voltage switching in the event that the on state of switch 110 is terminated by the current sense comparator 610, a large increase in the off time must be avoided. Normally, the off time is equal to the ringing voltage waveform that appears across switch 110. During overload, the off time increases by the remainder of the on time and can be several times longer than the optimal value. To reduce the increase, a current sink 625 is added to the controller. That current sink is turned on by the inverted output of the R-S latch 620. When the inverted output of the latch is high, the current flowing in sink 625 adds to the current flowing in transistor 414, and capacitor 260 quickly discharges to the voltage of source 440. Thus, the increase in the off time limit is kept at a minimum, and the likelihood of losing zero-voltage switching during overload is small.

Referring now to FIGS. 16A-D, there are shown waveform diagrams illustrating characteristic waveforms exhibited by the circuit of FIG. 15. FIG. 16A is a waveform diagram of the voltage across timing capacitor 260. FIG. 16B is a waveform diagram of the current in switch 110. FIG. 16C is a waveform diagram of the drive voltage of switch 110. FIG. 16D is a waveform diagram of the voltage across switch 110.

Some combinations of load and input voltage and/or excessive component tolerances can lead to the loss of zero-voltage switching. When that happens, the dissipation in the power switch 110 suddenly increases to a value which is several times higher than the normal. Such a high dissipation can easily destroy switch 110, so it is desirable to provide protection against that possibility. The circuit illustrated in FIG. 17 serves to provide such overdissipation protection.

Referring now to FIG. 17, the controller subcircuit 770 includes all circuitry of any of the controllers of FIGS. 7, 9, 11, and 13, except for the error amplifier 280 and its associated input resistor 300, feedback capacitor 310, reference source 290, zero-voltage comparator 320, and voltage source 330. A soft-start subcircuit 755 detects that the supply voltage appeared at a terminal 776 or a logic level appeared at a terminal 778 and, as a response, it gradually ramps the voltage at a terminal 777 from a low level to a high level. The gradually increasing voltage at terminal 777 causes a gradual increase in the voltage at a junction 767 of the anode terminals of diodes 760 and 765, leading to a gradual increase in the on time, from a low value to a high value. The end result is a gradually increasing converter output voltage that is referred to as a soft start. During a soft start, the average dissipation in the power switch 110 of the converter is reduced, because the switch voltage and current are small. The average dissipation can be reduced even further if the soft-start subcircuit is designed in such a way that the converter is kept completely off during the first part of a soft start sequence. It should be noted that there are many possible circuit solutions that can provide such a soft start function.

Referring finally to FIG. 17, there is shown a schematic circuit diagram illustrating implementation of overdissipation and overvoltage protection circuitry in the circuit of FIG. 7. The loss of zero-voltage switching is detected by simultaneously monitoring the gate and drain voltages of the power MOSFET switch 110. When those voltages are simultaneously high due to loss of zero-voltage switching, the output of gate 710 is also high, and current course 715 is turned on. A capacitor 20 and a resistor 725 filter out the DC component of the current pulses that flow in current source 715. When that DC component causes a voltage drop in resistor 725 in excess of that of voltage source 735, the output of a comparator 730 goes high and initiates a soft start cycle through a dual input OR gate 750. A soft start cycle can also be initiated through the other input of gate 750. That is useful, for example, when an overvoltage event occurs, either at the output or across the power switch 110. When the voltage exceeds that of voltage source 745, the output of a comparator 740 goes high and initiates the soft start cycle.

While the controllers of the present invention have been described in combination with a ZVS flyback converter, they may also be combined with other types of ZVS converters, such as buck, boost, buck-boost, forward, SEPIC, and ZETA, as well as with various type of push-pull, half-bridge or full-bridge converters or a class E inverter. In a variation of the present invention, turning on and off the currents that charge and discharge the timing capacitor in the circuits of FIGS. 7 and 9 could be accomplished by using series switches instead of shunting the input currents of the current mirrors with parallel switches. Furthermore, in all of the illustrated embodiments of the present invention, the current mirror, that charges the timing capacitor during the off time could be replaced with a resistor, In addition, the temporary inhibition of the zero-voltage detection signal at the beginning of the off interval, illustrated as being accomplished with comparator 445 that monitors the voltage across the timing capacitor, could as well be performed by an independent timer circuit triggered at the instant the power switch is turned off.

I claim:

1. A pulse width modulation controller for use in a zero-voltage switching resonant power apparatus employing a power switch, the controller comprising:

an on-timing circuit for setting an on time of the power switch;

modulation means for modulating a time interval generated by said on-timing circuit such that an output voltage of the power apparatus remains proportional to a reference voltage during conditions of varying input voltages and load currents;

voltage detection means for detecting that a voltage across the power switch has decreased below a threshold voltage during an off time of the power switch;

an off-timing circuit for setting a maximum time limit of an off time of the power switch;

termination means for terminating an off state of the power switch; and disabling means for disabling the voltage detection means for a fraction of a maximum off time of the power switch, the fraction of time beginning at an instant at which the power switch is turned off.

2. A pulse width modulation controller as in claim 1, further comprising:

a timing capacitor;

a voltage controlled current sink connected to the timing capacitor;

a constant current source connected to the timing capacitor;

an R-S latch having a non-inverting output connected to a gate terminal of the power switch;

first voltage comparator means connected to the timing capacitor, the first voltage comparator means being responsive to a decrease in a voltage across the timing capacitor below a first threshold voltage, the first voltage comparator means having an output connected to a reset input of the R-S latch;

second voltage comparator means connected to the timing capacitor, the second voltage comparator means being responsive to an increase in the voltage across the timing capacitor above a second threshold voltage that is higher than the first threshold voltage, an output of the second voltage comparator means being connected to a set input of the R-S latch;

error amplifier means responsive to an output voltage of the power apparatus, an output of the error amplifier means being connected to an input of the voltage controlled current sink such that a current flowing in the voltage controlled current sink increases when an output voltage of the error amplifier means decreases;

third voltage comparator means connected to the power switch and being responsive to a voltage across the power switch decreasing below a third threshold voltage, an output of the third voltage comparator means being connected to a first input of a two-input AND gate;

fourth voltage comparator means connected to the timing capacitor, the fourth voltage comparator means being responsive to the voltage across the timing capacitor increasing beyond a fourth threshold voltage that is between said first and second threshold voltages, the output of the fourth voltage comparator means being connected to a second input of said AND gate;

a high-current switched current source connected to the timing capacitor, the high-current switched current source being responsive to an output of said AND gate;

a first transistor connected between the voltage controlled current sink and the R-S latch for reducing the current flowing in the voltage controlled current sink to essentially zero when a non-inverting output of the R-S latch is at a low voltage; and a second transistor connected between the voltage controlled current sink and the R-S latch such that a current supplied by the constant current source is reduced to essentially zero when the non-inverting output of the R-S latch is a a high voltage.

3. A pulse width modulation controller as in claim 1, further comprising:

a timing capacitor;

a voltage controlled current sink connected to the timing capacitor;

a constant current source connected to the timing capacitor;

a first R-S latch having a non-inverting output connected to a gate terminal of the power switch;

a second R-S latch;

first voltage comparator means connected to the timing capacitor, the first voltage comparator means being responsive to a voltage across the timing capacitor decreasing below a first threshold voltage, an output of the first voltage comparator means being connected to a reset input of the first R-S latch and to a reset input of the second R-S latch;

second voltage comparator means connected to the timing capacitor, the second voltage comparator means being responsive to the voltage across the timing capacitor exceeding a second threshold voltage that is higher than the first threshold voltage, the output of the second voltage comparator means being connected to a set input of the second R-S latch and to a first input of a two-input OR gate;

error amplifier means responsive to an output voltage of the power apparatus, an output of the error amplifier means being connected to an input of the voltage controlled current sink such that a current flowing in the voltage controlled current sink increases when an output voltage of the error amplifier means decreases;

third voltage comparator means connected to the power switch and being responsive to a voltage across the power switch decreasing below a third threshold voltage, an output of the third voltage comparator means being connected to a first input of a two-input AND gate;

fourth voltage comparator means connected to the timing capacitor, the fourth voltage comparator means being responsive to the voltage across the timing capacitor exceeding a fourth threshold voltage that is between said first and second threshold voltages, the output of the fourth voltage comparator means being connected to a second input of said AND gate, an output of said AND gate being connected to a second input of said OR gate, an output of said OR gate being connected to a set input of said first R-S latch;

a first transistor connected between the voltage controlled current sink and the second R-S latch for reducing the current flowing in the voltage controlled current sink to essentially zero when a non-inverting output of the second R-S latch is at a low voltage; and a second transistor connected between the voltage controlled current sink and the R-S latch such that a current supplied by the constant current source is reduced to essentially zero when the non-inverting output of the first R-S latch is a a high voltage.

4. A pulse width modulation controller as in claim 1, further comprising:

a first timing capacitor;

a second timing capacitor;

a first constant current source connected to the first timing capacitor;

a second constant current source connected to the second timing capacitor;

first voltage comparator means having an inverting input, a non-inverting input, and an output;

an R-S latch having a set input, a reset input, an inverting output, and a non-inverting output;

a two-input OR gate;

a two-input AND gate;

error amplifier means responsive to an output voltage of the power apparatus such that the output voltage of the error amplifier decreases when the output voltage of the power apparatus increases, the error amplifier means having an output connected to the inverting input of the first voltage comparator means, the non-inverting input of the first voltage comparator means being connected to the first timing capacitor, the output of the first voltage comparator means being connected to the reset input of the R-S latch, and the non-inverting output of the R-S latch being connected to a gate terminal of the power switch;

second voltage comparator means connected to the second timing capacitor, the second voltage comparator means being responsive to a voltage across the second timing capacitor exceeding a first threshold voltage, an output of the second voltage comparator means being connected to a first input of the two-input OR gate, an output of the OR gate being connected to the set input of the R-S latch;

third voltage comparator means connected to the power switch and being responsive to a voltage across the power switch decreasing below a second threshold voltage, an output of the third voltage comparator means being connected to a first input of the two-input AND gate;

fourth voltage comparator means connected to the second timing capacitor, the fourth voltage comparator means being responsive to the voltage across the second timing capacitor exceeding a third threshold voltage that is less than the first threshold voltage, the output of the fourth voltage comparator means being connected to a second input of said AND gate, an output of said AND gate being connected to a second input of said OR gate;

a first transistor connected to the first timing capacitor for discharging the first timing capacitor when the inverting output of the R-S latch is at a high voltage; and a second transistor connected to the second timing capacitor for discharging the second timing capacitor when the non-inverting output of the R-S latch is high.

5. A pulse width modulation controller as in claim 1, further comprising:

a first timing capacitor;

a second timing capacitor;

a constant current source connected to the first timing capacitor;

a voltage controlled current source having an input and having an output connected to the second timing capacitor;

a first threshold voltage source for supplying a first threshold voltage;

an R-S latch having a set input, a reset input, an inverting output, and a non-inverting output, the non-inverting output thereof being connected to a gate terminal of the power switch;

a two-input OR gate, an output thereof being connected to the set input of said R-S latch;

a two-input AND gate, an output thereof being connected to a second input of the two-input OR gate;

error amplifier means responsive to an output voltage of the power apparatus such that the output voltage of the error amplifier decreases when the output voltage of the power apparatus increases, the error amplifier means having an output connected to the input of the voltage controlled current source;

first voltage comparator means having a non-inverting input connected to the first timing capacitor and having an inverting input connected to the first threshold voltage source, an output of the first voltage comparator means being connected to the reset input of an R-S latch;

second voltage comparator means connected to the second timing capacitor, the second voltage comparator means being responsive to a voltage across the second timing capacitor exceeding the first threshold voltage, an output of the second voltage comparator means being connected to a first input of the two-input OR gate;

third voltage comparator means connected to the power switch and being responsive to a voltage across the power switch decreasing below a second threshold voltage, an output of the third voltage comparator means being connected to a first input of the two-input AND gate;

fourth voltage comparator means connected to the second timing capacitor, the fourth voltage comparator means being responsive to the voltage across the second timing capacitor exceeding a third threshold voltage that is less than the first threshold voltage, an output of the fourth voltage comparator means being connected to a second input of said AND gate;

a first transistor connected to the first timing capacitor for discharging the first timing capacitor when the inverting output of the R-S latch is at a high voltage; and a second transistor connected to the second timing capacitor for discharging the second timing capacitor when the non-inverting output of the R-S latch is at a high voltage.

6. A pulse width modulation controller as in claim 2, further comprising:

current sensing means for generating a voltage proportional to an instantaneous current in the power switch;

fifth voltage comparator means connected to the current sensing means, the fifth voltage comparator means being responsive to a voltage generated by the current sensing means;

a second R-S latch having a set input connected to an output of the fifth voltage comparator means and having a reset input connected to the output of the first voltage comparator means;

a second two-input AND gate having an output connected to the gate terminal of the power switch, having a first input connected to the non-inverting output of said R-S latch, and having a second input connected to an inverting output of said second R-S latch; and second current sink means connected between a circuit ground return and said timing capacitor, said second current sink means being responsive to the inverting output of said second R-S latch.

7. A pulse width modulation controller as in claim 3, further comprising:

current sensing means for generating a voltage proportional to an instantaneous current in the power switch;

fifth voltage comparator means connected to said current sensing means, said fifth voltage comparator means being responsive to the voltage generated by said current sensing means;

a third R-S latch having a set input connected to an output of the fifth voltage comparator means and having a reset input connected to the output of the first voltage comparator means;

a second two-input AND gate having an output connected to the gate of the power switch, having a first input connected to the non-inverting output of said R-S latch, and having a second input connected to an inverting output of said third R-S latch; and current sink means connected between a circuit ground return and said timing capacitor and being responsive to an inverting output of said third R-S latch.

8. A pulse width modulation controller as in claim 1, further comprising:

a soft start circuit responsive to a trigger signal such that an output of the soft start circuit gradually changes from a value corresponding to a relatively short on time of said on-timing circuit when the trigger signal appears to a value corresponding to a relatively long on time of said on-timing circuit;

an analog AND gate having a first input connected to an output of said modulation means, having a second input connected to the output of the soft start circuit, and having an output connected to an input of the on-timing circuit, an output of said analog AND gate being proportional to the lesser of voltages at its first and second inputs;

overlap detector means for detecting that a voltage across the power switch is higher than a predetermined voltage at an instant in time at which a turn-on signal is initiated and for generating an output voltage that is proportional to the product of the voltage across the power switch and a period of time during which both the turn-on signal and the voltage across the power switch are high; and a trigger circuit connected to an output of the overlap detector means for generating said trigger signal when an output voltage of the overlap detector means exceeds a threshold voltage.

9. A pulse width modulation controller as in claim 1, further comprising:

a soft start circuit responsive to a trigger signal such that an output of the soft start circuit gradually changes from a value corresponding to a relatively short on time of said on-timing circuit when the trigger signal appears to a value corresponding to a relatively long on time of said on-timing circuit;

an analog AND gate having a first input connected to an output of said modulation means, having a second input connected to the output of the soft start circuit, and having an output connected to an input of the on-timing circuit, an output of said analog AND gate being proportional to the lesser of the voltages at its first and second inputs; and voltage detector means for detecting that an output voltage of the power apparatus exceeds a threshold voltage for responsively generating said trigger signal.

* * * * *